Figure 1:
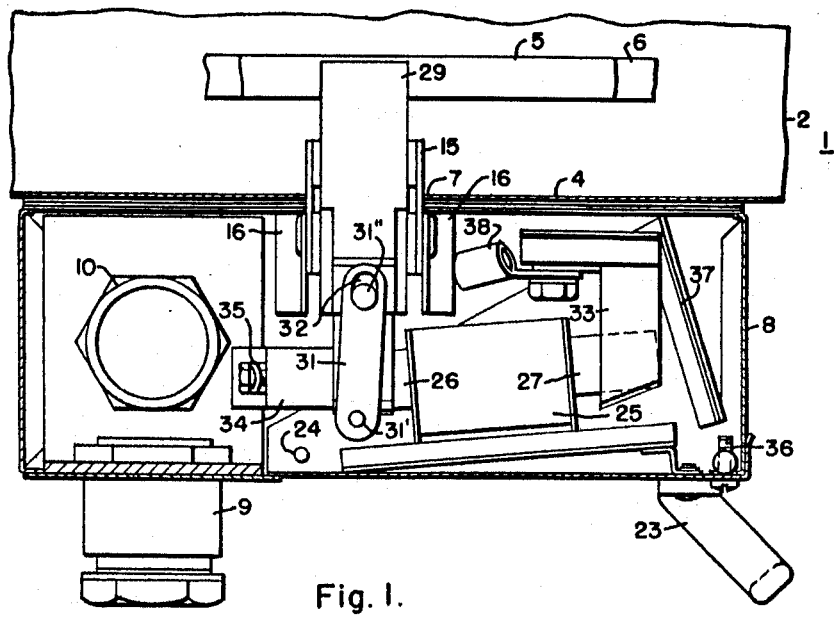

Nov. 29, 1960 G. GEYER ET AL 2,962,564
ENCASED ELECTRIC DISTRIBUTION DEVICES
Filed July 16, 1957 3 Sheets-Sheet 1

WITNESSES:
Bernard R. Gieguez
Wm. B. Sellers.

INVENTORS
Gerhard Geyer and
Hans Seidel.
BY
ATTORNEY

Nov. 29, 1960 G. GEYER ET AL 2,962,564
ENCASED ELECTRIC DISTRIBUTION DEVICES
Filed July 16, 1957 3 Sheets-Sheet 2

United States Patent Office 2,962,564
Patented Nov. 29, 1960

2,962,564

ENCASED ELECTRIC DISTRIBUTION DEVICES

Gerhard Geyer and Hans Seidel, Regensburg, Germany, assignors to Siemens-Schuckertwerke Aktiengesellschaft, Erlangen, Germany, a corporation of Germany Filed July 16, 1957, Ser. No. 672,288

Claims priority, application Germany July 27, 1956

8 Claims. (Cl. 200—50)

In plants using power consuming units which are moved from one location to another more or less frequently, particularly in factories, there are often used encased electric distribution systems which consist of casings (bus bar casings) joined together and provided with rigid uninsulated conductors (bus bars). These distribution systems are designed so that it is possible to position, and remove again, junction boxes with branch leads at different stations of the distribution system. For this purpose, the bus bar casings are provided with a plurality of openings through which contact members of the respective junction box can be connected to the bus bars. Normally, the junction boxes include electrical overload protection means, particularly fuse elements adapted to disconnect the branch leads upon the occurrence of excess currents.

It is already known to utilize the hinged cover of the junction box as a support for the electric protection means, particularly fuse elements, as well as for the contact members cooperable with the bus bars. In the closed position of said cover, the contact members are engaged with said bus bars, whereas in the open position of the cover, said contact members are disengaged from the bus bars. This construction of the junction box has the drawback that both closing and opening of the cover may cause arcing between the contact members of the junction box and the bus bars if the load devices supplied through the branch leads inadvertently have not been switched off. The electric arcs may damage the bus bars, but they will at least impair the bridge contacts between the bus bars and the branch leads.

The invention eliminates these disadvantages. It relates to an encased electric distribution system comprised of a plurality of casings and including bus bars as well as a plurality of individual junction boxes for branch leads, which junction boxes are attachable to the bus bar casings and contain electrical overload protection means, particularly fuse elements, disposed in the branch leads, said junction boxes being adapted to cause contact members associated with the branch leads to establish contact with the bus bars when the covers of said junction boxes are closed, and to break such contact when said covers are opened. According to the invention each junction box contains a contact device disposed in the branch leads and adapted to be closed, upon closure of the cover, after the contact members of the junction box have contacted the bus bars, and to be opened, upon opening of said cover, prior to disengagement of said contact members from the bus bars.

In the distribution system according to the invention, closing and opening of the contact members of the junction box which cooperate with the bus bars takes place in a currentless state even if the load devices connected to the branch leads should accidentally not have been switched off. Consequently, the formation of electric arcs at the bus bars is impossible. The bus bars are not unfavorably affected so that connecting the branch leads will not result in a contact deterioration. In case any load devices connected to the branch leads were not switched off, arcs will appear only at the additional contact device provided in the junction box. Thus, any damage possibly caused by arcing would be confined to the junction box alone. The latter, or its contact members, as the case may be, can be replaced much more easily than the bus bars which extend throughout several bus bar casings. Besides, a replacement of the bus bars would result in considerable disturbance of the distribution system since a great many power consuming units would be without power.

An advantageous modification of the invention resides in that the means for securing the junction box to the bus bar casing can be operated so as to be moved to or from its effective (fastened) position only when the cover of the junction box is in its open position. This insures that the junction box can be attached to, or detached from, the casing only when there is no current flow.

Figure 3:
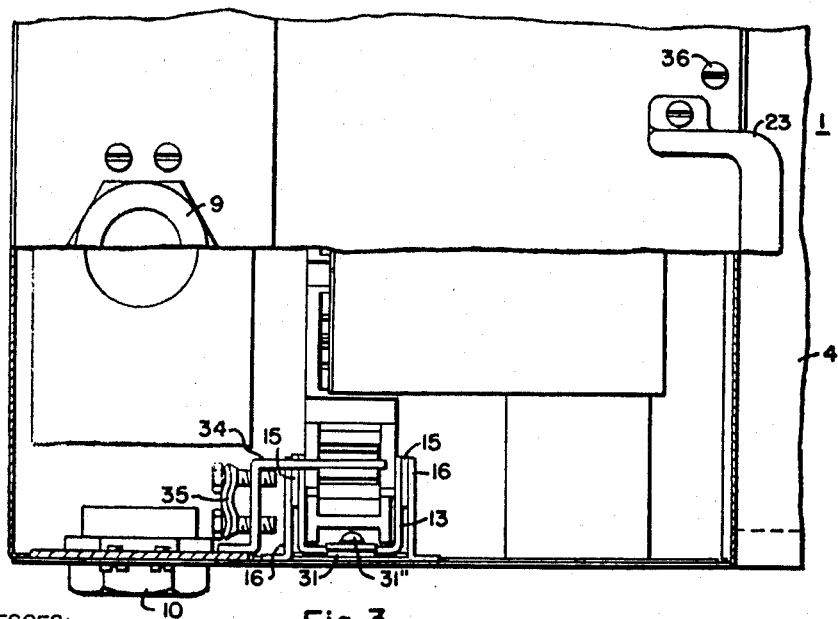
Figure 2:
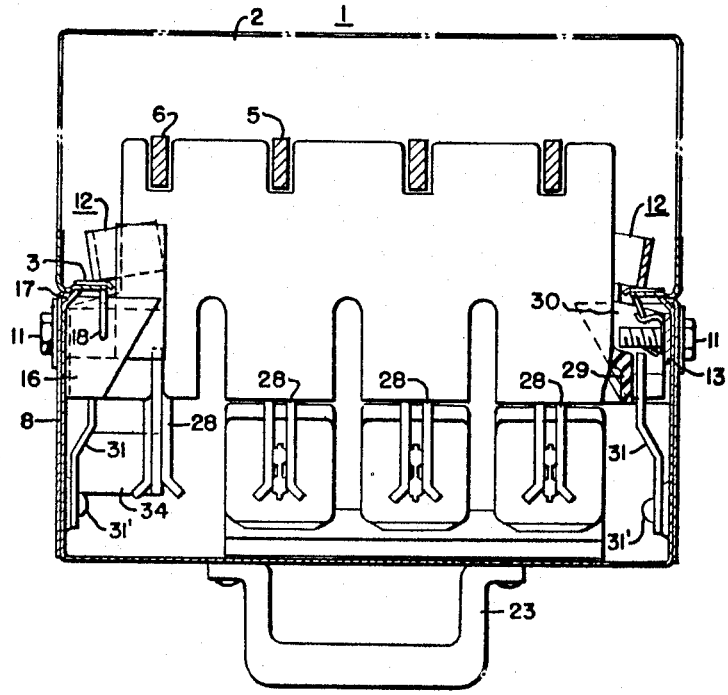
Figure 13:
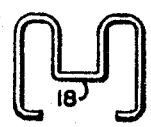

An embodiment of the invention is shown, by way of example, in the drawings, in which Figs. 1 to 3 are different sectional views of a junction box mounted on a bus bar casing; Figs. 4–7 illustrate the cover of the junction box in various positions; Figs. 8–12 show various positions of the means for connecting the junction box to the bus bar casing; Fig. 13 shows a detail of the inventive device.

The encased electric distribution system generally consists of a plurality of composite bus bar casings 1, only one of these casings being partially shown in the drawings. The casing 1 consists of an upper portion 2 having a U-shaped cross-section and provided with inwardly bent ears 3 on the side walls thereof. The lower side of said upper portion is closed by means of a cover plate 4. Inside said casing 1 there are arranged four rigid, uninsulated bus bars, reference numeral 5 designating the bus bars serving as terminal conductors, and 6 designating the bus bar serving as a zero or neutral conductor. The bus bars are held in place within the bus bar casing in suitable manner by means of insulating clamps (not shown). The cover plate 4 of the bus bar casing 1 is provided with apertures 7 which provide access to the bus bars 5, 6. Wherever the bus bar casing has such opening 7, there can be provided a junction box 8 for the connection of branch leads (not shown). The latter may be inserted through lead-in sleeves 9, 10 disposed in the lower side or in the side wall of the box.

For securing the junction box 8 to the bus bar casing there is provided a particularly formed means (Figs. 1–3, 8–13) preferably consisting of a screw 11 and a hook member 12. When loosened, said screw 11 may be tilted in the wall of the junction box 8. The hook member consists of two U-shaped portions 13 and 14 which are interconnected at their legs by means of butt straps 15. The U-shaped portion 13 has screwed therein the screw 11. The U-shaped portion 14 coacts with the inwardly bent ear 3 of the bus bar casing 1. For guiding the hook member 12 on the junction box 8 there are provided two plates 16 welded to the wall of the junction box 8. The latter is provided with a chute 17 adapted to cooperate with the hook member 12. The hook member is under the influence of an "aligning" spring 18 shown in detail in Fig. 13. This spring 18 is subtantially U-shaped and engages with its ends, which are bent inwardly, circular holes in the plates 16, and cam slots 19 in the hook member 13. From this it is evident that the slots 19 act as cam surfaces for the hook member. Furthermore, the hook member has additional cam surfaces provided on a multibent extension 20. The U-shaped spring 18, the ends of which engage circular holes in the plates 16, is guided also by notches 21 provided in said plates 16. The mid-portion of said spring 18 cooperates with the cam surfaces of the extension 20 of the hook member.

Figure 8:
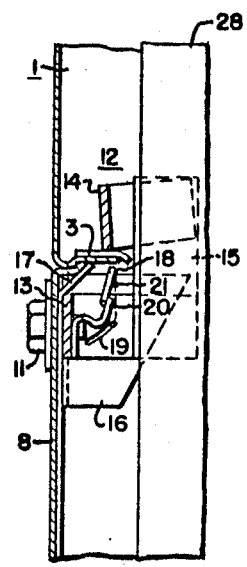
Figure 9:
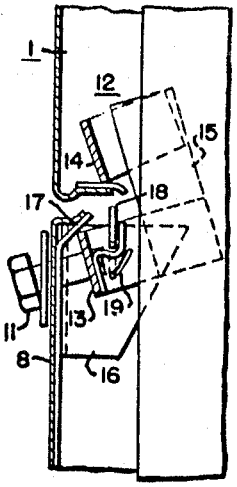
Figure 10:
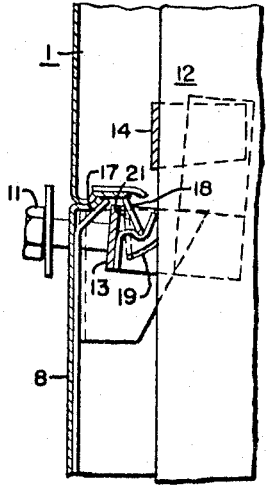
Figure 11:
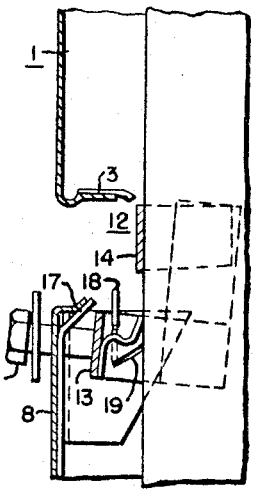
Figure 12:
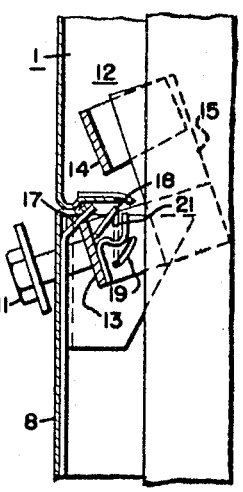

The connecting means, just described, between the bus bar casing 1 and the junction box 8 operates as follows:

Fig. 8 shows the junction box mounted on the bus bar box 1. The U-shaped portion 13 of the hook member 12 is pressed against the wall of the box 8 by means of the screw 11. The screw 11 may be tilted when made loose. The U-shaped portion 14 of the hook member is grasping behind the flank 3 of the bus bar box. Thus, the hook member is in its effective position. In this position the directing or aligning spring 18 is deformed because its middle portion is bent off somewhat by means of the shape or cam surface of the extension piece 20. The piece 20 is fixed on the U-shaped portion 13. For removing the junction box 8 from the bus bar enclosure 1, the screw 11 is made loose. Due to this screw 11 and the hook member 13 are now in an inclined position. Simultaneously the end portions of the spring 18 being bent inwardly move downwardly in the curved slot 19. The spring 18 releases when returning in its plane, i.e., its tension is relieved since the spring returns to its normal position (Fig. 9). The hook member 12 when in the inclined position slides somewhat upwardly along the inclined surface 17 of the junction box 8, but still remains in its operating position. For moving the hook member 12 to the release position the junction box 8 is to be moved against the bus bar enclosure 1, so that said box 8 joins said enclosure 1 (shown in Fig. 10). Thereby the spring 18 is deformed. The originating elasticity affects the hook member, turning said hook member in clockwise direction. The hook member attains its release position. The hook member remains in the release position when the box 8 is lowered, as shown in Fig. 11. The junction box may be removed now from the bus bar enclosure 1. The hook member 12 is in the release position, as shown in Fig. 11 when rejoining the box 8. For rejoining, the junction box 8 is moved against the bus bar enclosure. Thereby the spring 18 is deformed. The spring 18 when bent causes the hook member 12 to turn in counterclockwise direction whereby said hook member is moved to its operating position. The hook member 12 remains in its operating position when the screw 11 is tightened. The U-shaped portion 13 of said hook member is now engaging the wall of the junction box, as shown in Fig. 8.

According to the invention, the junction box 8 is provided with a cover 22 which is rotatable around the axis 24 by means of the handle 23. On the inside of the cover electrical protecting devices against overload, for example, fusible devices 25 having knife contacts 26 and 27, are disposed. Movable plug-in contact members 28 are used so as to provide engagement between the branch leads of the junction box and the bus bars 5 and 6. Each of said contact members comprises two contact springs adapted to receive the bus bars 5 and 6, respectively, therebetween. These contact members are preferably supported by means of a slide or carrier 29 of insulating material, said slide being disposed on the junction box 8. For guiding said insulating slide 29, there are provided the hook members 12 which are supported by the plates 16 of the junction box. Said slide has a length approximately equal to the distance between the opposed inside walls of the junction box 8. Between said slide and the inside wall there is only a small intermediate space adapted to receive the thickness of the U-shaped portion 13 of the hook member 12. The shaft of the screw 11 of the mounting device is in engagement with a niche 30 in the slide. The slide 29 is flexibly coupled with the cover 22, preferably by means of two links 31. One end of each link 31 is connected to the cover 22 by a rivet 31'. The other end of each link 31 is connected to the slide by a pin 31". At the pin 31" an end play 32 is provided which aids in performing the particular function of the slide as described hereinlater.

With regard to the flexible connection between the cover 22 and the slide 29 the engagement between the contact members 28 and the bus bars 5 and 6 is caused when the cover is closed. Said engagement is interrupted, however, when said cover is opened. According to the invention, a contact device is disposed within the junction box 8, said contact device being connected to the branch leads. When closing the cover said contact device closes after the time that the contact members of the junction box have touched the bus bars. When opening said cover, however, said contact device opens before the contact members are removed from the bus bars. When fuse elements having knife contacts are disposed within the junction box the contact device preferably comprises one knife contact element 27 of each of said fuse elements and the corresponding double contact spring 33. This double contact spring 33 is fixed within the junction box. The other knife contact element 26 of the fuse device 25 is in engagement with the contact member 28 of the slide 29.

The course of the current in the branch leads is as follows: From the bus bars 5 the current flows across the contact member 28 of the slide 29 and the knife contact elements 26 and 27 of the fuse element 25 to the double contact spring 33 which is connected to the corresponding terminal lead of the branch leads by means of the cable socket 38. From the bus bar 6 constituting the neutral conductor the current flows to the contact member 28 of the slide 29 and across the angular bus 34 supporting the connecting terminal 35 for the neutral conductor of the branch leads.

As aforesaid described, the electrical protective devices, especially the fuse elements 25 disposed between the contact members 28 of the bus bars and the contact device 27, 33 connected to the bus lead, are mounted within the junction box.

The mode of operation of the junction box 8 upon operation of the cover 22 is illustrated in Figs. 4 to 7.

Figure 4:
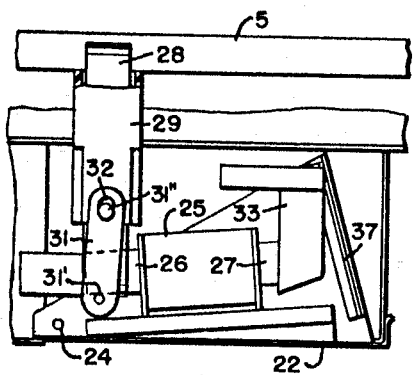
Figure 5:
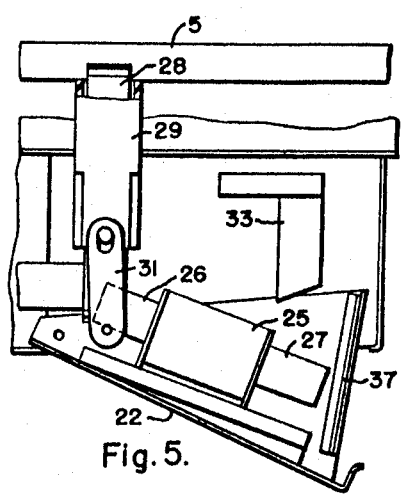
Figure 6:
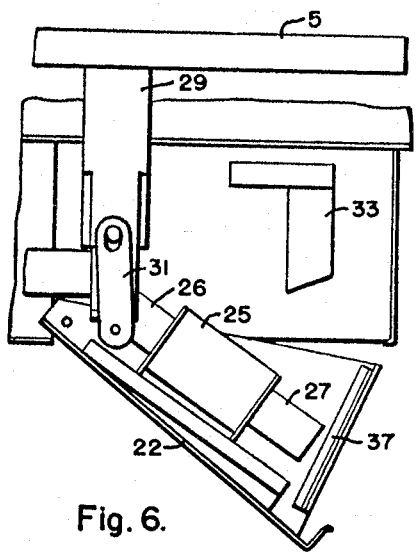
Figure 7:
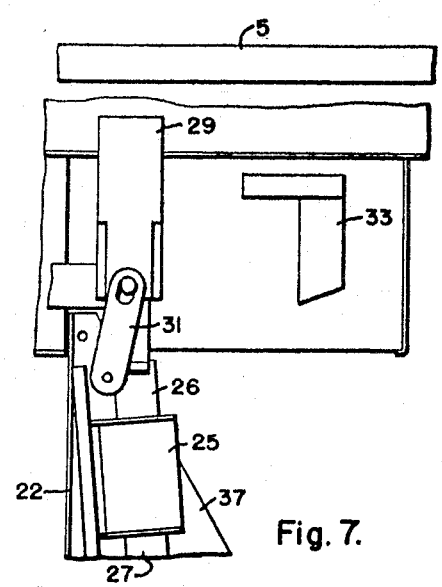

When the cover 22 is closed (it is secured in its closed position by the screw 36), the branch leads are electrically connected with the bus bars 5, 6 (Figs. 1 and 4). The contact members 28 embrace the bus bars 5, 6. The knife contact 27 of each fuse element 25 is in engagement with the double contact spring 33. As the cover 22 is opened, as illustrated in Fig. 5, the knife contact 27 of the fuse element 25 will be separated from the double contact spring 33 first. The contact members 28 of the slide 29, made of insulating material, still are in contact with the bus bars 5, 6. If, upon opening of the cover, a load unit connected to the branch leads is still in operation, an interruption arc will appear only at the additional contact device formed by the knife contact 27 and the double contact spring 33. In order to prevent the arc possibly occurring from reaching the outside, and to shield live parts so that they cannot be touched inadvertently, the cover 22 of the junction box is provided with a protective shield 37. Only by moving the cover 22 further toward its open position will the contact members 28 of the slide 29 be disengaged completely from the bus bars 5, 6, as shown in Fig. 6. Fig. 7 shows the cover 22 in its fully open position. When the cover of the junction box is closed, there will first be established contact between the contact members 28 of the insulating slide 29 and the bus bars 5, 6. Then the contact device comprising the knife contact 27 and the double contact spring 33 will be closed. Also upon closure of the cover, if any of the power using units connected to the branch leads are operative, arcs may occur only at the additional contact device accommodated within said junction box. Arcing at the bus bars 5, 6 as a result of opening and closing the cover is absolutely impossible, so that the bus bars will remain intact.

In the distribution system according to the invention, the cover 22 of the junction box is adapted advantageously to cooperate with the means for fastening the junction box 8 to the bus bar casing 1. This fastening means can be moved to or from its effective fastening position only when the cover 22 is in its open position. When the plug-in contact members 28 of the insulating slide 29 are in contact with the bus bars, the hook member 12 cannot be moved away from its effective position due to the particular configuration of the insulating slide 29. Thus, said fastening means is blocked by the insulating slide 29. On the other hand, in the position in which it is held by the tightened screw 11, the hook member 12 will not prevent movement of the insulating slide. However, after the latter has moved away from the bus bars, movement of the hook member 12 can be rendered possible by loosening the screw 11. The insulating slide 29 is in the switch-off position only when the cover 22 is open. This cooperation of the means for securing the junction box to the bus bar casing with the insulating slide and, consequently, with the cover 22 of the junction box, will ensure that the junction box can be mounted on, and removed from, the bus bar casing only when there is no current flow.

We claim as our invention:

1. In an encased electric distribution system, in combination, a casing having a plurality of bus bars disposed inside the casing, a junction box for branch leads mounted on the outside of the casing and having an openable cover, fuse elements disposed in the junction box and connected in said branch leads, contact members associated with said branch leads and disposed in the junction box to establish contact with said bus bars when the cover of the junction box is closed and to break such contact when the cover is opened, said contact members being mounted on a slide of insulating material, said slide being guided by the junction box and pivotally coupled with the cover through a pair of links, means for fastening the junction box to the bus bar casing, movement of said fastening means to release the junction box being blocked in the closed position of the cover of the junction box by the insulating slide which carries the contact members, and said fastening means being released by said insulating slide in the open position of the cover.

2. In an encased electric distribution system, in combination, a casing having a plurality of bus bars disposed inside the casing, a junction box for branch leads mounted on the outside of the casing and having an openable cover, fuse elements disposed in the junction box and connected in said branch leads, contact members associated with said branch leads and disposed in the junction box to establish contact with said bus bars when the cover of the junction box is closed and to break such contact when the cover is opened, said contact members being mounted on a slide of insulating material, said slide being guided by the junction box and pivotally coupled with the cover through a pair of links, means for fastening the junction box to the bus bar casing, and cam surfaces and an aligning spring disposed in the junction box and cooperating with the cam surfaces to cause said fastening means to assume its effective position upon the mounting of the junction box on the casing or its releasing position upon the removal of the junction box from the casing.

3. In an encased electric distribution system, in combination, a casing having a plurality of bus bars disposed inside the casing, a junction box for branch leads mounted on the outside of the casing and having an openable cover, fuse elements disposed in the junction box and connected in said branch leads, contact members associated with said branch leads and disposed in the junction box to establish contact with said bus bars when the cover of the junction box is closed and to break such contact when the cover is opened, said contact members being mounted on a slide of insulating material, said slide being guided by the junction box and pivotally coupled with the cover through a pair of links, means for fastening the junction box to the bus bar casing, said fastening means comprising a screw tiltably supported by the junction box, a hook member carried by the screw, cam surfaces on the junction box and on the hook member for determining the movements of the hook member, additional cam surfaces on the hook member, and an aligning spring cooperating with said additional cam surfaces to move the fastening means when said screw is loosened.

4. In an encased electric distribution system, in combination, a casing having a plurality of bus bars disposed inside the casing, a junction box for branch leads mounted on the outside of the casing and having an openable cover, fuse elements disposed in the junction box and connected in said branch leads, contact members associated with said branch leads and disposed in the junction box to establish contact with said bus bars when the cover of the junction box is closed and to break such contact when the cover is opened, said contact members being mounted on a slide of insulating material, said slide being pivotally coupled with the cover through a pair of links, means for fastening the junction box to the bus bar casing, said fastening means comprising a screw tiltably supported by the junction box, a hook member carried by the screw, cam surfaces on the junction box and on the hook member for determining the movements of the hook member, additional cam surfaces on the hook member, an aligning spring cooperating with said additional cam surfaces to move the fastening means when said screw is loosened, said hook member being actuated by said screw to a position to retain the junction box on the casing, and movement of said insulating slide being non-obstructed by the hook member when it is in its retaining position.

5. In a junction box for attaching to a casing having bus bars disposed inside the casing, in combination, an openable cover for the box, contact members movably mounted in the junction box to make contact with the bus bars when the cover of the junction box is closed and to break such contact when the cover is opened, electric circuits established through said contact members, a circuit opening and closing device disposed in the junction box, said device opening the circuits through the contact members prior to the separation of the contact members from the bus bars upon opening the cover and closing the circuits through the contact members after the engagement of the contact members with the bus bars upon closing the cover, linkage means having a lost-motion connection for coupling said contact members with said cover to actuate the contact members by opening and closing movement of the cover, means movable from outside of the junction box for fastening the box to the bus bar casing, movement of said fastening means to release the junction box being blocked in the closed position of the cover of the junction box, and said fastening means being released in the open position of the cover.

6. In a junction box for attaching to a casing having bus bars disposed inside the casing, in combination, a pivoted cover for the box, contact members movably mounted in the junction box to make contact with the bus bars when the cover of the junction box is closed and to break such contact when the cover is opened, said contact members being mounted on a carrier of insulating material slidably disposed in the junction box, electric circuits established through said contact members, a circuit opening and closing device actuated by the cover to open the circuits through the contact members prior to separation of the contact members from the bus bars upon opening the cover and to close the circuits through the contact members after engagement of the contact members with the bus bars upon closing the cover, linkage means coupling said carrier with said cover to actuate the carrier by movement of the cover about its pivot point, the distance between the linkage means and the pivot point for the cover being less than the distance between the linkage means and the contact device, means movable from outside of the junction box for fastening the box to the bus bar casing, movement of said fastening means to release the junction box being blocked by said insulating carrier when said contact members are in contact with said bus bars, and said fastening means being released when said contact members are out of contact with said bus bars.

7. In an encased electric distribution system, in combination, a casing having a plurality of bus bars disposed inside the casing, a junction box for branch leads mounted on the outside of the casing and having an openable cover, contact members associated with said branch leads and disposed in the junction box to establish contact with said bus bars when the cover of the junction box is closed and to break such contact when the cover is opened, said contact members being mounted on a slide of insulating material, said slide being guided by the junction box and pivotally coupled with the cover through a pair of links, means movable from outside of the junction box for fastening the box to the bus bar casing, movement of said fastening means to release the junction box being blocked in the closed position of the cover of the junction box, and said fastening means being released in the open position of the cover.

8. In an encased electric distribution system, in combination, a casing having a plurality of bus bars disposed inside the casing, a junction box for branch leads mounted on the outside of the casing and having an openable cover, contact members associated with said branch leads and disposed in the junction box to establish contact with said bus bars when the cover of the junction box is closed and to break such contact when the cover is opened, said contact members being mounted on a slide of insulating material, said slide being guided by the junction box and pivotally coupled with the cover through a pair of links, means movable from outside of the junction box for fastening the box to the bus bar casing, movement of said fastening means to release the junction box being blocked by said insulating slide when said contact members are in contact with said bus bars, and said fastening means being released when said contact members are out of contact with said bus bars.

References Cited in the file of this patent

UNITED STATES PATENTS

| | | |
|---|---|---|
| 1,896,545 | Jirka | Feb. 7, 1933 |
| 1,968,619 | Reed | July 31, 1934 |
| 2,088,105 | Frank | July 27, 1937 |
| 2,124,269 | Anderson | July 19, 1938 |
| 2,129,723 | Wood | Sept. 13, 1938 |
| 2,786,908 | Constantine | Mar. 26, 1957 |
| 2,795,739 | Wood | June 11, 1957 |